United States Patent [19]

Kaplan et al.

[11] 3,723,405

[45] Mar. 27, 1973

[54] TECHNIQUE FOR BONDING ANTIOXIDANTS TO POLYMER FILMS

[75] Inventors: Martin Louis Kaplan, Whippany; Paul Goggin Kelleher, Maplewood, both of N.J.

[73] Assignee: Bell Telephone Laboratories, Incorporated, Murray Hill, Berkeley Heights, N.J.

[22] Filed: Apr. 10, 1972

[21] Appl. No.: 242,792

[52] U.S. Cl..........................260/94.9 GB, 260/45.9 R
[51] Int. Cl................................................C08f 27/08
[58] Field of Search..................260/94.9 GB, 45.9 R

[56] References Cited

UNITED STATES PATENTS 3,658,755   4/1972   Moon et al.......................260/45.9 R

*Primary Examiner*—Donald E. Czaja
*Assistant Examiner*—M. J. Welsh
*Attorney*—R. J. Guenther et al.

[57] ABSTRACT

A technique is described for stabilizing polyolefins against degradation attributed to thermal oxidation. The described technique involves bonding a carbene, obtained by the decomposition of 3,5-ditertiarybutyl-benzene-1,4-diazooxide, to the alpha olefin.

8 Claims, No Drawings

TECHNIQUE FOR BONDING ANTIOXIDANTS TO POLYMER FILMS

This invention relates to a technique for bonding antioxidants to polymer chains. More particularly, the present invention relates to a technique for stabilizing polyolefinic hydrocarbons against oxidative degradation by chemical bonding of an antioxidant to the polymer chain.

It is well known that, while polymers of alpha olefins, for example polyethylene, polypropylene and the like are in many respects highly desirable materials for formation into extruded and molded products, they suffer severe degradation under the influence of light and heat unless they are treated or modified to increase their stability. Much effort has been expended toward improving this property of these polymers and considerable success has been achieved. The most common and perhaps most effective method for enhancing stability has been to incorporate a phenolic antioxidant, a thiodialkanoic acid ester, an organic phosphite, or a combination of these materials into the polymer. Unfortunately, the antioxidants commonly employed are limited in their efficacy by physical loss which is attributed to diffusion with subsequent evaporation or extraction. In order to minimize or eliminate such losses, workers in the art have suggested the use of increasingly larger antioxidants, so tending to immobilize the molecule in the polymer network and prevent diffusive losses, or the chemical bonding of the antioxidant to the polymer chain.

In accordance with the present invention, the prior art limitations are effectively obviated by a novel procedure for chemically bonding an antioxidant to the olefinic polymer chain. Briefly, the inventive technique involves diazotizing 2,6-ditertiarybutylaminophenol to yield 3,5-ditertiarybutylbenzene-1,4-diazooxide, adding the resultant diazooxide in solution to the polymer of interest and after removing the solvent effecting the decomposition of the diazooxide by thermal or photochemical means. The decomposition results in the formation of a carbene, a chemical species including a divalent carbon atom, which chemically bonds with the polymer. During this bonding process, an electronic rearrangement occurs with the formation of a hindered phenol bonded chemically to the polymer. Studies have indicated that the resultant composition manifests superior stability with respect to oxidative degradation as compared with both unstabilized materials and those stabilized with conventional antioxidants when all the compositions have undergone an aqueous extraction procedure.

Polymers amenable to stabilization against oxidative degradation in accordance with the present invention are derived from alpha olefins such as ethylene. Typical polymers in this class are linear and branched (i.e., high and low density) polyethylene, polypropylene, polybutene as well as copolymers of the noted monomers.

The critical reactant in the inventive technique described herein is 3,5-ditertiarybutylbenzene-1,4-diazooxide. This compound may conveniently be obtained by the diazotization by conventional techniques of the corresponding aminophenol. The aminophenol may be prepared by the catalytic reduction of either 4-nitro-2,6-ditertiarybutylphenol or 4-nitroso-2,6-ditertiarybutylphenol in accordance with equation (1).

(1) 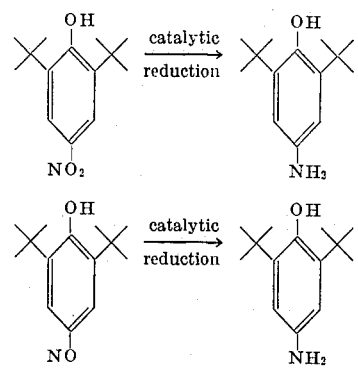

Any catalytic reduction known by workers in the art in the phenol field may be employed. Typical procedures would involve reduction at 100° C in the presence of tin and hydrochloric acid or the use of platinum oxide and several atmospheres of hydrogen. The diazooxide of interest may then be prepared by diazotization of the aminophenol by conventional techniques, as for example with nitrous acid, in accordance with equation (2).

(2) 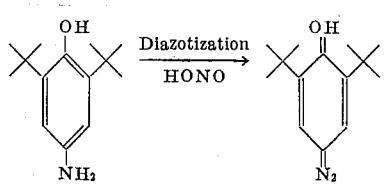

3,5-ditertiarybutylbenzene-1,4-diazooxide

The next step in the practice of the present invention involves adding the diazooxide to the polymeric composition to be stabilized. This end may conveniently be attained by initially forming a solution of the diazooxide. Typical materials suitable for this purpose are the aromatic and aliphatic hydrocarbons, aliphatic ethers and halogenated aliphatics. Preferred compounds are methylene chloride, diethyl ether, hexane and benzene. In the formation of the solution, the ratio of solvent to solute is dictated by practical considerations.

Following, the solution of diazooxide is added to the polymer and the solvent evaporated, at approximately room temperature by any conventional technique, as for example in a rotary evaporator, thereby resulting in a uniform dispersion of oxide on the polymer surface; then, the diazooxide is decomposed either by thermal means or by photochemical techniques well known in the art (see J. Amer. Chem. Soc., Vol. 86, p. 4203 (1964)), so resulting in the loss of the nitrogen molecule and the formation of a reactive intermediate known as a carbene (Equation (3)).

(3) 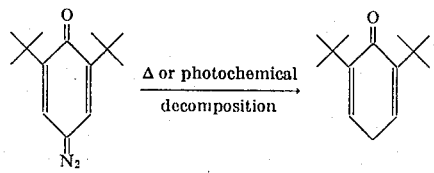

A typical thermal decomposition sequence would involve heating the polymer and diazooxide to a temperature within the range of 130° – 150° C for a time period ranging from 1 to 2 minutes at pressures ranging from 15,000 to 20,000 psi. Those conditions are commonly utilized in molding and extrusion processes to which these polymers are subjected.

Photochemical decomposition may be effected as an alternative to thermal decomposition by exposing the polymer in the diazooxide solution to visible light having a wavelength greater than 3,000 A.

As indicated, during the heating cycle of the process, the carbene is formed and this species of chemical compound displaces a hydrogen atom in the polymer and bonds thereto in the vacant space. The resultant composition is now ready for stability studies.

An example of the present invention is set forth below for purposes of illustration and is not to be construed as a limitation.

EXAMPLE

A solution comprising 0.005 grams of 3,5-ditertiarybutyl-1,4-diazooxide (DTBDO) in 10 ml of methylene chloride was prepared, the diazooxide having been obtained by diazotization of 4-amino-2,6-ditertiarybutylbenzene. The resultant solution was added to 1 gram of low density branched polyethylene powder (0.92 g/cm³). The solvent was next removed at a pressure of the order of 30 torr. and 0.010 inch films were molded at 140° C for 1 minute during which carbene insertion occurred.

For comparative purposes, 1 gram of polyethylene of the type described was added to 0.5 per cent by weight of 2,6-ditertiarybutylphenol (DTBP) and a third sample of polyethylene (1 gram) was maintained as a control. The three polymer films, unstabilized, DTBP and DTBDO stabilized were then extracted in a Soxhlet apparatus with water for 30 hours. After drying in vacuo, the films were subjected to oxygen uptake studies at 140° C. The results are set forth in the Table.

TABLE

| Stabilizer | Hours to Failure (1% oxygen incorporation) |
|---|---|
| None | 3 |
| DTBP | 5 |
| DTBDO | 14 |

The data clearly indicates that the described technique for bonding of antioxidants in the carbene family to polymer chains results in a significant enhancement in stability to oxidative degradation as compared with a conventional prior art stabilizer and with an unstabilized polymer.

What is claimed is:

1. Technique for stabilizing a polyolefin against oxidative degradation which comprises the steps of
   a. mixing 3,5-ditertiarybutylbenzene-1,4-diazooxide with a poly alpha olefin, and
   b. effecting the decomposition of said diazooxide, so resulting in the formation of a carbene which displaces a hydrogen atom from said alpha olefin and bonds thereto in the space created by said displacement and subsequently results in the formation of a hindered phenol bonded chemically to said olefin.

2. Technique in accordance with claim 1 wherein said decomposition is effected by heating the diazooxidepolyolefin mixture to a temperature within the range of 310° – 150° C for a time period ranging from 1 – 2 minutes.

3. Technique in accordance with claim 1 wherein said decomposition is effected by exposing the polyolefin in contact with the diazooxide to a source of visible light having a wavelength greater than 3,000 A.

4. Technique in accordance with claim 2 wherein said polyolefin is polyethylene.

5. Technique in accordance with claim 4 wherein said polyethylene has a density of 0.92 g/cm³.

6. Stabilized composition of matter comprising a poly alpha olefin having a carbene bonded thereto, said carbene being the decomposition product of 3,5-ditertiarybutylbenzene-1,4-diazooxide.

7. Composition in accordance with claim 6 wherein said poly alpha olefin is polyethylene.

8. Composition in accordance with claim 7 wherein said poly alpha olefin is low density branched polyethylene.

* * * * *